(12) United States Patent
Prozzo

(10) Patent No.: US 6,590,690 B2
(45) Date of Patent: Jul. 8, 2003

(54) ELECTRONICALLY MODULATING AN OPTICAL LIGHT SOURCE

(75) Inventor: Christopher D. Prozzo, Athens, VT (US)

(73) Assignee: Bacharach, Inc., New Kensington, PA (US)

( * ) Notice: Subject to any disclaimer, the term of this patent is extended or adjusted under 35 U.S.C. 154(b) by 0 days.

(21) Appl. No.: 09/872,273

(22) Filed: May 31, 2001

(65) Prior Publication Data

US 2002/0109898 A1 Aug. 15, 2002

Related U.S. Application Data

(60) Provisional application No. 60/209,167, filed on Jun. 2, 2000.

(51) Int. Cl.$^7$ ................................................. G02F 1/00
(52) U.S. Cl. ...................................... 359/237; 359/239
(58) Field of Search ............................... 359/239, 237, 359/322, 279; 250/252

(56) References Cited

U.S. PATENT DOCUMENTS 5,745,282 A * 4/1998 Negi ........................... 359/322

* cited by examiner

Primary Examiner—Hung Xuan Dang
Assistant Examiner—Tuyen Tra
(74) Attorney, Agent, or Firm—Webb Ziesenheim Logsdon Orkin & Hanson, P.C.

(57) ABSTRACT

Method of modulating an optical light source to maintain stability with time, temperature and any variation in the source's electrical connections.

1 Claim, 1 Drawing Sheet

ELECTRONICALLY MODULATING AN OPTICAL LIGHT SOURCE

CROSS-REFERENCE TO RELATED APPLICATION

This application is based on provisional application Serial No. 60/209,167 which was filed on Jun. 2, 2000.

BACKGROUND

1. Field of the Invention

This invention relates to providing a light source for analytical purposes that is stable with time, temperature and any variation in electrical connecting means.

2. Description of Related Art

Optical absorption spectroscopy is a measurement technique for identifying and quantifying known as well as unknown substances. The measurement is typically performed by relating the amount of light from a light source passing through or reflecting off of the sample under test, with that same light passing through or reflecting off a reference sample. A wavelength-selecting device is placed in the optical path either before the detector or after the light source to limit the spectrum to a specific wavelength region or regions necessary to perform the measurement. The light source is typically an electrically heated element, which produces optical emission proportional to the temperature to which it is heated. The measurement accuracy is then limited by the thermal stability of the light source.

Due to the nature of some optical detectors, which are only sensitive to changes in optical energy, it is sometimes necessary to modulate the light source in order to produce an electrical output from the detector. Modulation can be done in one of three ways, mechanically, optically or electronically. Electronic modulation is the subject of this invention.

To electronically modulate a light source, current passing through it is periodically interrupted or is itself modulated to vary the electrical power delivered to the light source and in so doing vary its temperature. This technique is often referred to as "pulsing". Since the temperature is intentionally varied in pulsing, thermal stability issues become more complex. During pulsing, the source cycles between a high and low temperature. The stability of both of these points as well as their timing now become factors affecting the accuracy and stability of the optical measurement. Primary factors affecting the absolute value of the high and low temperatures are as follows;

1. Ambient temperature;
2. Mass of the heated element;
3. Thermal resistance or heat sinking properties of the source structure and surrounding atmosphere;
4. Element electrical resistance; and
5. Electrical power delivered to the element;

The focus of this invention lies in controlling the effect of pulsing, i.e., the frequency and waveform of the pulsing, on the elements electrical resistance and the electrical power delivered to the element.

SUMMARY OF THE INVENTION

The present invention is a method of modulating an optical light source comprising: (a) feeding a solid state voltage reference into a non-inverting input of an operational amplifier through a resistive divider to provide an output from said amplifier; (b) passing the output of said operational amplifier through a series pass transistor which regulates the current from a power supply to the optical light source and to provide a voltage across said light source; (c) feeding said voltage across said light source back to an inverting input of said operational amplifier to provide a feedback signal; (d) generating a clock signal with a crystal-controlled oscillator; (e) shorting the non-inverting input of said operational amplifier to ground synchronously with said clock signal; and (f) taking said feedback signal provided in step (c) through separate wires to the terminals of said light source thus eliminating the adverse effect of cable and connector contact resistances.

DETAILED DESCRIPTION OF THE INVENTION

Figure 1:
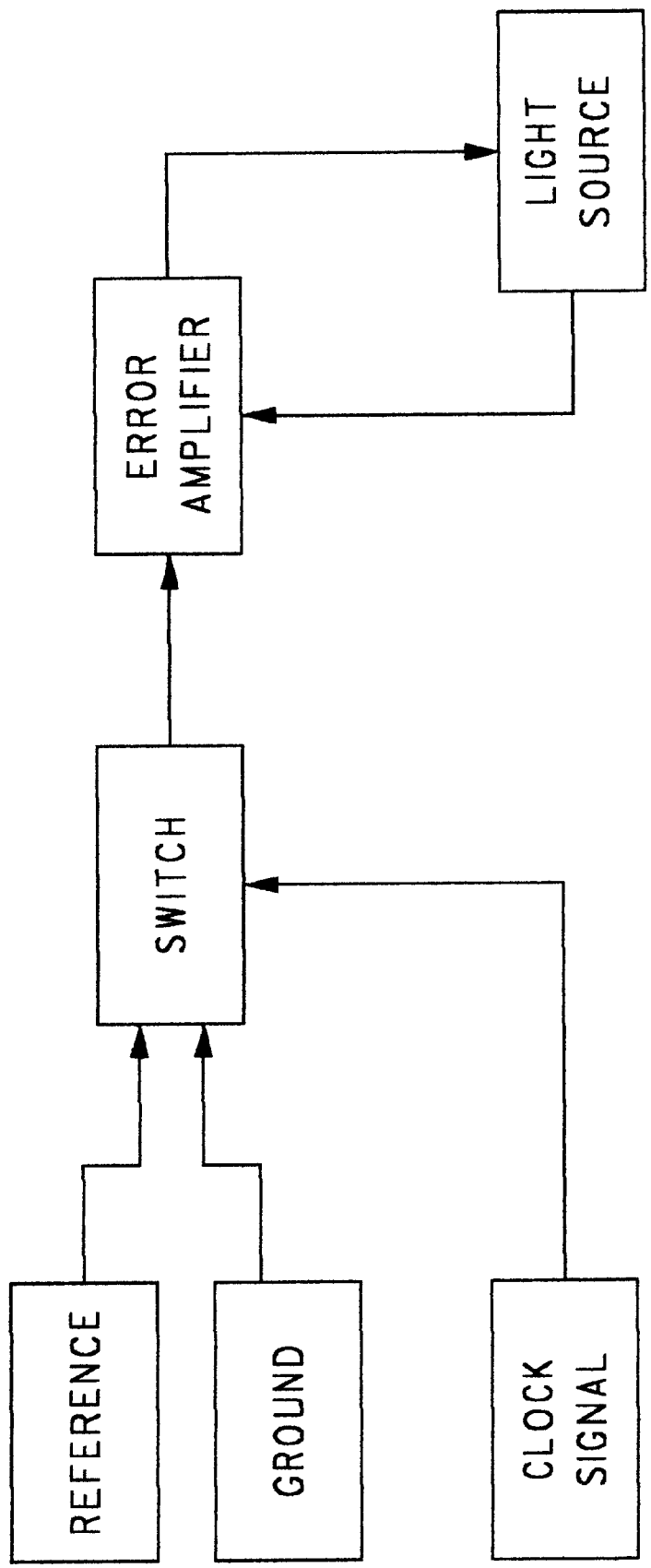
FIG. 1 is a block diagram of a preferred embodiment of the present invention.

The object of this invention is to provide a simple low cost means of delivering electrical pulses to an optical light source that are themselves highly stable with time, temperature and variation in source connection means. The design employs a stable voltage reference which is dynamically compared to either the voltage across the source (for constant voltage control) or across a shunt (for constant current control) by an error amplifier which then maintains a constant relationship between the two.

Modulation is performed in one of two ways, either the reference voltage is varied, or the reference input to the error amplifier is switched to either a second reference or to ground potential. Both types of modulation are done synchronously with a clock signal.

In FIG. 1, a solid state voltage reference is fed into the non-inverting input of an operational amplifier through a resistive divider. The output of the operational amplifier drives a series pass transistor which regulates the current from a power supply to the optical source. The voltage across the source is fed back to the inverting input of the operational amplifier. A solid state switch shorts the non-inverting input of the operational amplifier to ground synchronously with a clock signal. The clock signal is generated with a crystal-controlled oscillator. By taking the feedback signal through separate wires directly to the source terminals, the effects of cable and connector contact resistance are eliminated.

What is claimed is:

1. A method of modulating an optical light source comprising the following steps, in sequence:

1.) feeding a solid state voltage reference into a non-inverting input of an operational amplifier through a resistive divider to provide an output from said amplifier;

2.) passing the output of said operational amplifier through a series pass transistor which regulates the current from a power supply to the optical light source and to provide a voltage across said light source;

3.) feeding said voltage across said light source back to an inverting input of said operational amplifier to provide a feedback signal;

4.) generating a clock signal with a crystal-controlled oscillator;

5.) shorting the non-inverting input of said operational amplifier to ground synchronously with said clock signal; and 6.) taking said feedback signal provided in step three through separate wires to the terminals of said light source thus eliminating the adverse effect of cable and connector contact resistances.

* * * * *